United States Patent [19]
Troyankin et al.

[11] 3,990,878
[45] Nov. 9, 1976

[54] GLASS MELTING APPARATUS

[76] Inventors: Jury Vasilievich Troyankin, Uralskaya ulitsa, 6, korpus 5, kv. 32; Vyacheslav Mikhailovich Smirnov, Butyrskaya ulitsa, 9, kv. 5; Boris Alexandrovich Sokolov, Flotskaya ulitsa, 29, korpus 1, kv. 176; Konstantin Timofeevich Bondarev, Nizhnyaya Pervomaiskaya ulitsa, 33, kv. 171; Vera Vasilievna Pollyak, Bolshaya Semenovskaya ulitsa, 29/2, kv. 47; Vadim Alexandrovich Chubinidze, Vorobievskoe shosse, 9, kv. 34; Nikolai Pavlovich Kabanov, ulitsa, Nizhnyaya Maslovka, 6, kv.8, all of, Moscow; Evgeny Pavlovich Kurashvili, Iskrovsky prospekt, 20, kv. 296; Vladimir Alexandrovich Ilinsky, ulitsa Krjukova, 17, kv. 10, both of, Leningrad, all of U.S.S.R.

[22] Filed: Feb. 10, 1976

[21] Appl. No.: 656,892

[52] U.S. Cl. .................................. 65/347; 65/341; 65/346; 65/356

[51] Int. Cl.² ............................................. C03B 5/08
[58] Field of Search ............ 65/347, 356, 346, 339, 65/341

[56] References Cited
UNITED STATES PATENTS

| | | | |
|---|---|---|---|
| 1,421,210 | 6/1922 | Good | 65/347 X |
| 2,268,546 | 1/1942 | Forter | 65/341 X |
| 3,489,547 | 1/1970 | Plumat | 65/347 |
| 3,526,492 | 9/1970 | Motsch | 65/347 X |
| 3,563,722 | 2/1971 | Troyankin et al. | 65/347 X |

*Primary Examiner*—Arthur D. Kellogg
*Attorney, Agent, or Firm*—Robert E. Burns; Emmanuel J. Lobato; Bruce L. Adams

[57] ABSTRACT

The proposed glass melting apparatus comprises a cooled cylindrical chamber having an upper portion and a lower portion connected by an intermediate member, the lower portion of the chamber having a greater diameter than the upper portion and housing a cooled hollow body, the bottom of said body facing upwards. Said body is arranged above the level of the molten glass and is intended to raise the hydrodynamic stability of the mass of molten glass.

2 Claims, 3 Drawing Figures

GLASS MELTING APPARATUS

The present invention relates to glass melting apparatus and is applicable in the production of sheet, bottle, engineered, and refractory glass.

The invention can also be used in ferrous and non-ferrous metallurgy, chemical industry, and in the production of construction, materials.

At present there are widely known different types of glass melting apparatus.

One of the most effective among these is an apparatus comprising a cooled cylindrical chamber, a plurality of burners mounted along the periphery of the upper portion of said chamber and tangentially directed into the chamber, and a sump in which molten glass is homogenized, refined and cooled. The lower portion of said chamber is cone-shaped, its open end terminating in a divergent passage, said open end extending into the sump and being arranged to lie above the level of the molten glass in the sump. The burners are provided with nozzles for the supply of the charge (the glass producing raw materials).

In the glass melting apparatus under review, the fuel is natural gas and the oxidizer is air. Molten glass and combustion products are discharged through the lower cone-shaped portion of the chamber into the sump.

Such an apparatus has an output of 200 to 300 tons of molten glass each 24 hours. Attempts to raise the output result in a sharp acceleration of flue gases and an equally sharp increase in the aerodynamic drag of the chamber, so that the charge is carried away. All these factors tend to affect the quality of the glass being produced. In addition, raising the efficiency of the apparatus is hampered by limitations as regards the temperature of the molten glass and the flue gases in the sump which is made from a refractory material.

There is further known an apparatus for melting and thermally treating different materials, wherein combustion products are directed upwards and discharged via a branch pipe installed in the vault of the chamber, whereas the molten material is discharged downwards. At its lower portion, such a plant may have a bath or sump for the molten material. In the course of operation, the eddy stream of gases flows at a high speed over the surface of the molten glass and intensively stirs it, which speeds up the melting and homogenization processes. At this stage, said processes must be completed, yet the mixing of the molten glass results in its hydrodynamic instability. The mass of the molten glass becomes turbulent, and the process is accompanied by intensified sputtering of the melt and the formation of eddy streams therein, directed along the axis of the chamber. These factors account for unnecessarily large quantities of the molten glass leaving the chamber. The hydrodynamic instability and sputtering of the melt make it extremely difficult, to effectively control the glass melting process.

In addition, in conventional glass melting apparatus, the volume of the sump is insufficient to carry out in full the glass melting process.

It is the principal object of the present invention to provide a small-sized, but highly efficient glass melting apparatus.

It is another object of the invention to raise the quality of glass as a result of using the proposed apparatus.

It is still another object of the present invention to eliminate the hydrodynamic instability of molten glass, while maintaining sufficiently intensive mixing of the molten glass at the lower portion of the chamber.

It is yet another object of the present invention to provide a glass melting apparatus which would not need frequent maintenance jobs.

The foregoing and other objects of the invention are attained in a glass melting apparatus comprising a cooled cylindrical chamber having a branch pipe extending through its vault to remove combustion products from said chamber whose upper portion is completed with a system of pipelines for the supply of charge into the chamber and with nozzles for the supply of fuel mixture to said chamber, said nozzles being directed tangentially into the chamber, the lower portion of said chamber communicating with a sump for refining and homogenizing molten glass, in which apparatus, the upper and lower portions of said chamber are connected, in accordance with the invention, by an intermediate member, the lower portion of the chamber having a greater diameter than the upper portion and housing a cooled hollow body arranged along its axis, the bottom of said body being above the level of the molten glass and facing upwards, said body being intended to raise the hydrodynamic stability of the mass of molten glass.

It is expedient that the cooled hollow body be constructed in the form of a cylinder whose walls have orifices intended for the passage of molten glass into the cylinder whose interior communicates with the sump for refining and cooling the molten glass.

The present invention resides in the following.

The charge fed into the apparatus is thermally treated and processed inside the chamber, on its walls and in its lower portion where a bath of molten glass is produced.

An increased diameter of the lower portion of the chamber, as compared to its upper portion, accounts for the fact that molten glass can stay in the chamber for a period of time sufficient to effectively complete the production process. The upper and lower portions of the chamber are conjugated by means of an intermediate member constructed in the form of a truncated cone whose lower end terminates in a diverging passage.

Both the upper and lower portions of the chamber are cooled. The inner surface of the chamber is lined with a layer of refractory material, which makes it possible to raise the temperature in the chamber and thus accelerate the glass melting process.

In addition, the cooled walls in the lower portion of the chamber prolong effective service life of the apparatus between repair jobs. An increased temperature in the chamber accounts for an improved quality of the glass being produced.

The cooled hollow body arranged in the lower portion of the chamber, along its axis, has experimentally proved to be capable of eliminating the hydrodynamic instability of the molten glass, despite its intensified mixing.

A high speed of motion of the melt in the lower portion of the chamber and the absence of hydrodynamic instability substantially intensify the production process. As a result, it is possible to use glass melting apparatus having a smaller size and a greater output, as compared to conventional apparatus.

According to experimental data, an apparatus with a chamber diameter of 5 meters is capable of producing about 1,000 of glass each 24 hours.

Discharge of molten glass through the orifices in the cooled hollow body accounts for the fact that equal portions of molten glass stay in the lower portion of the chamber for equal periods of time, whereby the quality of the glass being produced is substantially improved.

The invention makes it possible to use relatively small-sized glass melting apparatus having a considerably increased output. Furthermore, it prolongs the effective service life of glass melting apparatus between overall maintenance and repair periods, raises the quality of the glass being produced and cuts down the amount of refractory materials used in the apparatus.

Other objects and advantages of the present invention will be more readily understood from the following detailed description of a preferred embodiments thereof taken in conjunction with the accompanying drawings, wherein.

Figure 1:
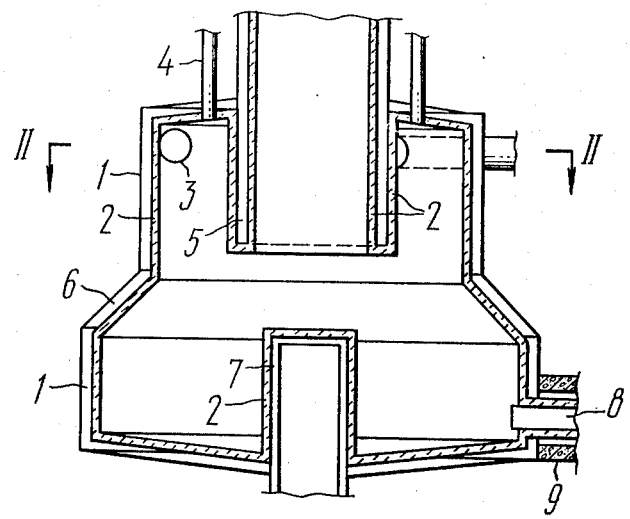
FIG. 1 is a schematic cross-sectional view of a glass melting apparatus in accordance with the invention.
Figure 2:
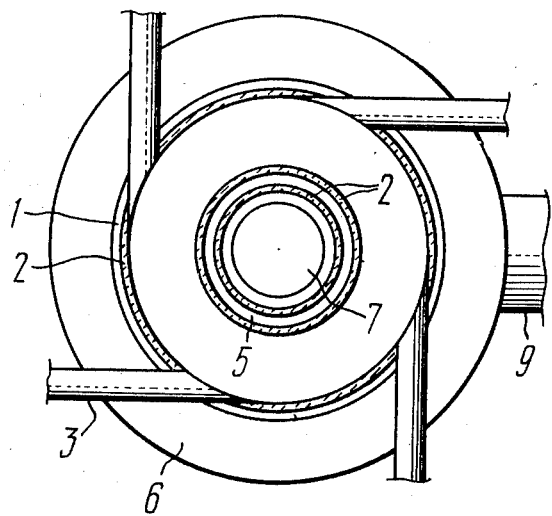
FIG. 2 is a section view taken along the line II—II of FIG. 1.
Figure 3:
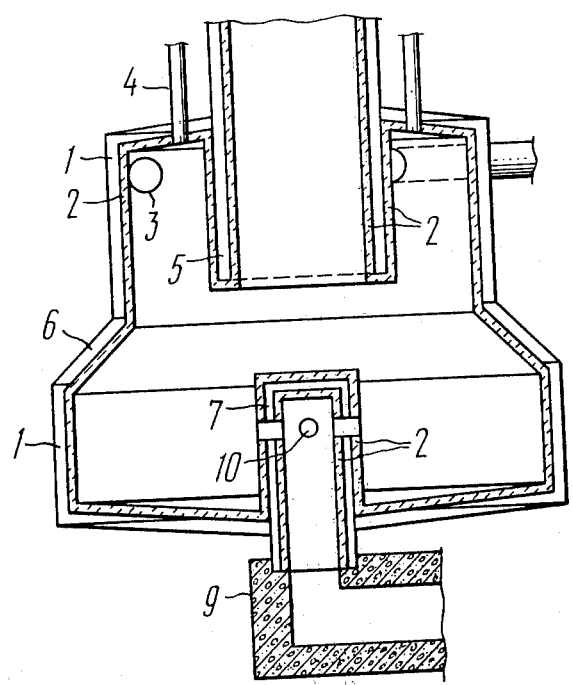
FIG. 3 is a schematic cross-sectional view of a glass melting apparatus in accordance with the invention, employing an alternative embodiment of the cooled hollow body.

Referring now to the accompanying drawings, the proposed glass melting apparatus comprises a chamber 1 (FIGS. 1, 2 and 3) which is a double-walled cylinder with a cooling agent being passed between the walls. The cooling agent may be, for example, water, steam-and-water mixture, or air. The walls of the chamber 1 are made from steel, their working surface being lined with a layer 2 of a refractory material which is a mixture of corundum, refractory clay and solution of ortho-phosphoric acid.

Uniformly spaced along the perimeter of the chamber 1, at its upper portion, and tangentially directed into said chamber 1 are nozzles 3 through which fuel mixture is supplied into the chamber 1. The fuel mixture is a mixture of natural gas and preheated air.

At its upper portion, the chamber 1 is also provided with a system of pipelines for feeding the charge through tuyeres 4 into the chamber 1.

Extending through the vault of the chamber 1, along its axis, is a branch pipe 5 intended for the discharge of combustion gases. The branch pipe 5 is constructed as a cylinder having double steel walls between which there is passed a cooling agent. The walls of the branch pipe 5 are lined with a refractory layer 2 of the same composition as that lining the walls of the chamber 1.

The upper portion of the chamber 1 communicates with its lower portion by means of an intermediate member 6 constructed as a truncated cone whose lower open end terminates in a diverging passage.

The diameter of the lower portion of the chamber 1 is greater than that of its upper portion; the lower portion of the chamber 1 is a bath for molten glass.

Arranged in the lower portion of the chamber 1, along its axis, is a cooled hollow body 7, its bottom facing upwards. The hollow body 7 is constructed as a double-walled cylinder, with a cooling agent being passed between its walls. The working surface of the body 7 is lined with the refractory layer 2 of the above-mentioned composition. The upper portion of the hollow body 7 is above the level of the molten glass, without extending outside the intermediate member 6.

At the lower portion of the chamber 1 there is an orifice 8 (FIG. 1) for the discharge of molten glass into a sump 9 for refining and cooling the molten glass.

The cooled hollow body 7 may be provided with holes 10 (FIG. 3) uniformly spaced along the perimeter of its walls. Said holes are intended for the passage of the molten glass from the lower portion of the chamber 1 inside the hollow body 7 whose interior communicates with the sump 9 for refining and cooling the molten glass.

The proposed glass melting apparatus operates as follows.

Charge is fed through the pipelines and the tuyeres 4 into the upper portion of the cylindrical chamber 1. A limited amount of compressed air may be used for feeding the charge. Fuel mixture is supplied through the nozzles 3 uniformly spaced along the perimeter of the chamber 1 and tangentially directed into said chamber 1. While burning in said chamber 1, the fuel mixture produces a high-temperature eddy stream of gases. Particles of the charge are caught by the stream of gases and drawn by the centrifugal forces toward the walls of the chamber 1. As the charge particles keep moving, they are subjected to thermal and technological treatment. Upon coming into contact with the walls of the chamber 1, the charge particles form a film of molten glass which flows down the walls to the lower portion of the chamber 1. The eddy stream of gases above the surface of the molten glass ensures heating and intensive mixing of the molten glass; in addition, it accelerates the glass melting process and ensures uniform properties of the molten glass.

Molten glass may also pass through the holes 10 in the walls of the body 7 into said body 7 whose interior communicates with the sump 9 for refining and cooling the molten glass and for subsequent treatment thereof.

Flue glasses are released from the chamber 1 through the branch pipe 5 installed in the upper portion of said chamber 1.

While the invention has been described herein in terms of a preferred embodiment, numerous variations may be made in the apparatus illustrated in the drawings and herein described without departing from the spirit and scope of the invention as set forth in the appended claims.

We claim:

1. A glass melting apparatus comprising a cylindrical chamber having an upper portion and a lower portion, the lower portion having a greater diameter than the upper portion; an intermediate member to conjugate said portions of said chamber; a branch pipe to discharge flue gases from said chamber, extending through the vault of said chamber; a system of pipelines for feeding charge into said chamber, said pipelines being arranged at the upper portion of said chamber; nozzles for the supply of fuel mixture to said chamber, said nozzles being arranged at the upper portion of said chamber and tangentially directed into said chamber; a cooled hollow body installed in said lower portion of said chamber, the bottom of said cooled hollow body facing upwards and lying above the level of molten glass, said hollow body being intended to raise hydrodynamic stability of said molten glass; a sump for refining and cooling molten glass, said sump communicating with said lower portion of said chamber.

2. A glass melting apparatus as defined in claim 1, wherein the cooled hollow body is constructed as a cylinder whose walls have holes for the passage of molten glass inside the cylinder whose interior communicates with the sump for refining and cooling molten glass.

* * * * *